United States Patent
Floyd et al.

(10) Patent No.: US 8,724,202 B2
(45) Date of Patent: May 13, 2014

(54) SWITCHABLE WINDOWS WITH MEMS SHUTTERS

(75) Inventors: Philip Don Floyd, Redwood City, CA (US); Wilhelmus Adrianus de Groot, Palo Alto, CA (US)

(73) Assignee: QUALCOMM MEMS Technologies, Inc., San Diego, CA (US)

(*) Notice: Subject to any disclaimer, the term of this patent is extended or adjusted under 35 U.S.C. 154(b) by 228 days.

(21) Appl. No.: 13/357,441

(22) Filed: Jan. 24, 2012

(65) Prior Publication Data

US 2013/0188235 A1 Jul. 25, 2013

(51) Int. Cl.
*G02B 26/02* (2006.01)

(52) U.S. Cl.
USPC .......................................... 359/230

(58) Field of Classification Search
CPC ...... G02B 26/0841; G02B 5/28; G02B 5/285; G02B 5/286; G02B 5/288
USPC .................... 359/290, 291, 230, 224.1, 227.1
See application file for complete search history.

(56) References Cited

U.S. PATENT DOCUMENTS

| | | | |
|---|---|---|---|
| 3,989,357 | A | 11/1976 | Kalt |
| 6,127,908 | A | 10/2000 | Bozler et al. |
| 6,236,491 | B1 | 5/2001 | Goodwin-Johansson |
| 6,396,620 | B1 | 5/2002 | Goodwin-Johansson |
| 6,972,889 | B2 * | 12/2005 | Goodwin-Johansson et al. ............... 359/290 |
| 7,123,216 | B1 | 10/2006 | Miles |
| 2007/0165293 | A1 | 7/2007 | Storaska et al. |
| 2009/0103166 | A1 | 4/2009 | Khazeni et al. |
| 2009/0237782 | A1 | 9/2009 | Takamatsu et al. |
| 2010/0313476 | A1 | 12/2010 | Sethuraman et al. |

FOREIGN PATENT DOCUMENTS

WO 2009133503 A1 11/2009

OTHER PUBLICATIONS

Lobontiu, Nicolae, and Ephrahim Garcia, "*Mechanics of Microelectromechanical Systems*." 2005, pp. 44-46, New York: Kluwer Academic. (ISBN 1-4020-8013-1).
Lamontagne Boris et al., "The next generation of switchable glass: the Micro-Blinds," Institute for Microstructural Sciences, National Research Council (Canada), Proceedings Glass Performance Days 2009, pp. 637-639.
Kim, Che-Heung et al., "A Wafer-Level Micro Mechanical Global Shutter for a Micro Camera," 2009 IEEE 22nd International Conference on Micro Electro Mechanical Systems, pp. 156-159.
Goodwin-Johansson, Scott et al., "High Speed, Large Motion Electrostatic Artificial Eyelid," 2002 IEEE 15th International Conference on Micro Electro Mechanical Systems, pp. 610-613.

(Continued)

*Primary Examiner* — Euncha Cherry
(74) *Attorney, Agent, or Firm* — Weaver Austin Villeneuve & Sampson, LLP

(57) ABSTRACT

An array of MEMS shutters may incorporate opaque and/or interference-based film stacks, to control light in a window. The shutter structure may include one or more layers with a controlled stress gradient, which makes a shutter arm curl out of plane and away from a defined aperture for light, thus permitting light to be transmitted through a transparent substrate and past the MEMS structure. To close the shutter, a voltage may be applied between an electrode in the shutter arm and an electrode covering a region on the substrate, rolling the shutter arm flat against the substrate electrode and placing the shutter arm over the aperture. The shutter arm may be configured to transmit selected wavelengths of light. In some implementations, the shutter arm may be configured to filter out infrared light.

29 Claims, 9 Drawing Sheets

(56) References Cited

OTHER PUBLICATIONS

Rosa, Michael A. et al, "A novel external electrode configuration for the electrostatic actuation of MEMS based devices," *J. Micromech. Microeng.*, Apr. 2004, vol. 14, No. 4, pp. 446-451.

Pizzi, Marco et al, "Microshutter Display Technology. On glass MOEMS for display applications," *Proc. of Polysilicon Technology and Applications for AM-LCDs and AM-OLEDs, Society for Information Display*, Centro Ricerche Fiat Microtechnology Dep., Mid Europe Charter, Mar. 21-22, 2002, Rome.

Pizzi, Marco et al, "New Type of Micro-mechanical Shutter Array for Replacement of Infrared Photodetector Arrays," 2003 IEEE/LEOS International Conference on Optical MEMS, pp. 173-174.

"Durchsicht per Knopfdruck", Glaswelt: Deutsche Glaserzeitung, Gentner Verlag, Stuttgart, DE, No. 7, Jan. 1, 2003, pp. 24-26, XP009167329, ISSN: 0017-1107.

International Search Report and Written Opinion—PCT/US2012/070385—ISA/EPO—Mar. 21, 2013.

\* cited by examiner

SWITCHABLE WINDOWS WITH MEMS SHUTTERS

TECHNICAL FIELD

This disclosure relates to smart glass devices.

DESCRIPTION OF THE RELATED TECHNOLOGY

"Smart glass" devices (also referred to herein as switchable windows or switchable devices) include materials and architectures that change their light transmission properties when an external stimulus is applied (voltage, current, heat, light, etc.). Electrically switchable smart glass devices include electrochromic devices and suspended particle devices. Electrochromic devices are substantially transparent when no voltage is applied and substantially opaque when voltage is applied. Suspended particle devices include microscopic, light-absorbing, rod-shaped particles (typically of a polyiodide) suspended in a fluid, which is held between two electrically conductive panes and placed between two glass or plastic panels. Some electrically switchable smart glass devices include one or more layers with a controlled stress gradient, which may be controlled to cover a defined aperture or to curl away from the aperture, allowing light transmission through the aperture.

Electrically switchable smart glass devices can be used for light control/shading, solar heating control in windows, privacy shades, and dimmable mirrors, among other uses. Each application typically requires a different technology.

SUMMARY

The systems, methods and devices of the disclosure each have several innovative aspects, no single one of which is solely responsible for the desirable attributes disclosed herein.

Some electrically switchable devices disclosed herein provide a single technology to address a variety of applications. Moreover, such implementations may potentially be provided at a lower cost than prior art switchable window systems. Some implementations include an array of MEMS shutters incorporating opaque and/or interference-based film stacks, to control light in a window. The shutter structure may include one or more layers with a controlled stress gradient, which makes a shutter arm curl out of plane and away from a defined aperture for light, thus permitting light to be transmitted through a transparent substrate and past the MEMS structure. To close the shutter, a voltage may be applied between an electrode in the shutter arm and an electrode covering a region on the substrate, rolling the shutter arm flat against the substrate electrode and placing the shutter arm over the aperture. The shutter arm may be configured to transmit selected wavelengths of light. In some implementations, the shutter arm may be configured to filter out infrared light.

One innovative aspect of the subject matter described in this disclosure can be implemented in a switchable device that includes a substrate stack having a substantially transparent substrate, an aperture and substrate electrodes. The switchable device also may include control circuitry configured for applying voltage to the substantially transparent electrodes, a rollable shutter arm and an interference filter configured to pass or filter out a range of light wavelengths. The rollable shutter arm may be configured to at least partially cover the aperture when the control circuitry is applying voltage to the substantially transparent electrodes and to curl up to expose the aperture when the control circuitry is not applying the voltage to the substrate electrodes. In some implementations, the switchable device may be configured to be disposed on a building window.

The rollable shutter arm may be configured to partially cover the aperture when a lower voltage is applied to the substrate electrodes and configured to cover the aperture more completely when a higher voltage is applied to the substrate electrodes. The substrate electrodes may be patterned into sections. Voltage may be applied separately to each of the sections. The rollable shutter arm may be configured to be moved between a range of positions, each position corresponding to a number of sections to which voltage has been applied.

The substantially transparent substrate may be formed, at least in part, of glass. In some implementations, the substantially transparent substrate may be formed, at least in part, of a polymer.

The substrate electrodes may be formed, at least in part, of a substantially transparent material. In some implementations, the substrate electrodes may be formed, at least in part, of a conductive metal.

In some implementations, the interference filter may be disposed, at least in part, on the shutter arm. The interference filter may be disposed, at least in part, on the substrate stack. A first part of the interference filter may be disposed on the substrate stack and a second part of the interference filter may be disposed on the shutter arm. In some implementations, the interference filter may be configured to filter out infrared wavelengths.

The shutter arm may include an absorber layer. Relatively less light may be transmitted through the aperture when the shutter arm covers the aperture. In some implementations, the shutter arm may be substantially opaque. However, in alternative implementations, the shutter arm may include transparent regions. In some implementations, the shutter arm may include translucent regions. The translucent regions may include color filter material.

The substrate electrodes may be disposed in the aperture. Alternatively, or additionally, the substrate electrodes may be disposed along edges of the aperture. In some implementations, the substrate electrodes may be tapered.

Another innovative aspect of the subject matter described in this disclosure can be implemented in a method that involves forming a substrate stack by depositing substrate electrodes on a substantially transparent substrate and forming an aperture area. The method may involve forming a rollable shutter arm attached to an area of the substrate stack proximate the aperture. The method may involve configuring the rollable shutter arm to cover the aperture when voltage is applied to the substrate electrodes and to curl up to at least partially expose the aperture when the voltage is not applied to the substrate electrodes. The method may involve forming an interference filter configured to pass or filter out a range of light wavelengths. The method also may involve configuring control circuitry for applying the voltage to the substrate electrodes. Forming the interference filter may involve forming at least a portion of the interference filter on the rollable shutter arm and/or on the substrate stack.

Details of one or more implementations of the subject matter described in this specification are set forth in the accompanying drawings and the description below. Other features, aspects, and potential advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
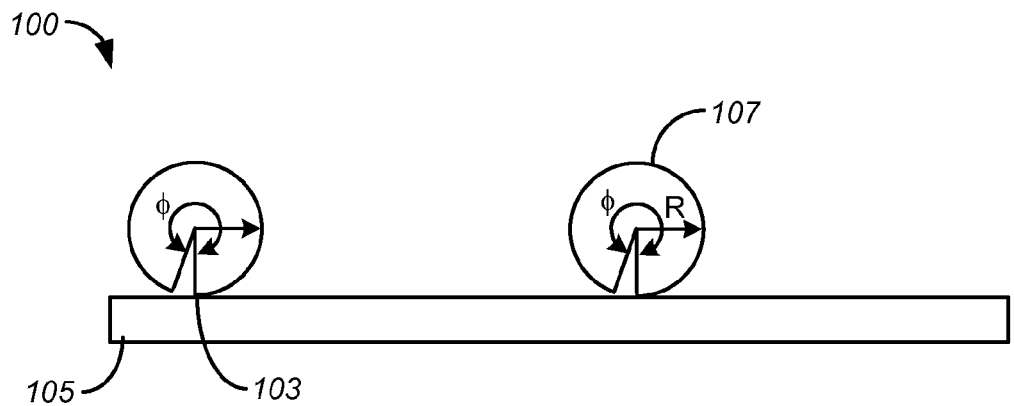
FIG. 1A shows an example of a portion of an array of shutter-based switchable devices.

The following description is directed to certain implementations for the purposes of describing the innovative aspects of this disclosure. However, a person having ordinary skill in the art will readily recognize that the teachings herein can be applied in a multitude of different ways. The described implementations may be implemented in various devices or systems, including but not limited to electromechanical systems (EMS), microelectromechanical systems (MEMS) and non-MEMS applications. Thus, the teachings are not intended to be limited to the implementations depicted solely in the Figures, but instead have wide applicability as will be readily apparent to one having ordinary skill in the art.

Some implementations describe herein include an array of MEMS shutters incorporating opaque and/or interference-based film stacks, to control light in a window. The shutter structure may include one or more layers with a controlled stress gradient, which makes a shutter arm curl out of plane and away from a defined aperture for light, thus permitting light to be transmitted through a transparent substrate stack and past the MEMS structure. To close the shutter, a voltage may be applied between an electrode in the shutter arm and one or more electrodes covering a region on the substrate stack, rolling the shutter arm flat against the substrate electrode and placing the shutter arm over the aperture. Although various implementations that include substantially transparent substrate electrodes are described herein, in some alternative implementations the substrate electrodes may be formed, at least in part, of other conductive materials, e.g., a conductive metal such as aluminum, an aluminum alloy, titanium, gold, silver, etc.

Particular implementations of the subject matter described in this disclosure can be implemented to realize one or more of the following potential advantages. Some electrically switchable devices disclosed herein provide a single technology to address a variety of applications. Some implementations may have shutter arms and/or substrates that include interferometric layers for selectively blocking (or selectively transmitting) specific wavelengths of light. The wavelengths may correspond to visible colors in some implementations, whereas in other implementations the wavelengths may correspond to infrared light. For example, the switchable device may be configured such that visible light is transmitted when infrared light is blocked, or vice versa.

Such applications may include a shutter arm having an absorber layer thickness that is selected to allow a desired amount of light to be transmitted through the closed switchable device. In some such implementations, the thickness of the absorber layer may be selected such that little or no observable light is transmitted through the closed switchable device. Transmission through the closed switchable device may be made specular, not diffuse, if so desired. Additionally, interference filters can be included in the shutter arm or substrate, permitting modification to the color or wavelength of light transmitted and reflected from the window. For instance transmitted or reflected light can be filtered to permit switching of the color. Or infrared wavelength can be selectively filtered for controlling radiant solar energy transmitted through a window. These changes can be implemented by changing the layer sequence in the shutter arm or on the substrate, while maintaining the basic physical shape of the shutter arm. Some implementations may potentially be provided at a lower cost than that of prior art switchable window systems.

FIG. 1A shows an example of a portion of an array of shutter-based switchable devices. The switchable devices 100 are disposed on a substantially transparent substrate 105, which may be formed of glass, a polymer and/or another suitable substantially transparent material. In the example depicted in FIG. 1A, the shutter arm 107 of each of the switchable devices 100 is in an open or furled state. Each of the shutter arms 107 has a radius R and is attached to the substantially transparent substrate 105 at an anchor point 103. Each of the shutter arms 107 extends through an angle φ from the anchor area 103 to the end of the shutter arm 107.

Figure 1B:
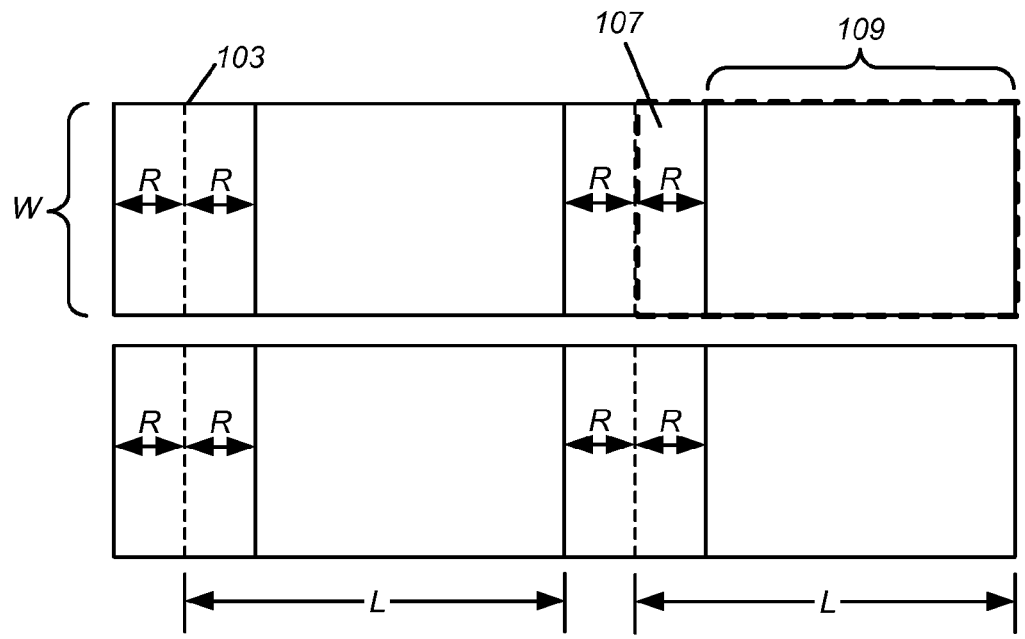
FIG. 1B shows an example of a top view of the array of shutter-based switchable devices of FIG. 1A.

FIG. 1B shows an example of a top view of the array of shutter-based switchable devices of FIG. 1A. Four of the switchable devices 100 are shown in FIG. 1B, each of which is depicted with the shutter arm 107 in an unfurled or closed state. Each of the shutter arms 107 has a length L and a width W. In this example, the area of the aperture 109 corresponds with the area of the switchable device 100 that is not occupied by the shutter arm 107 when furled. For a shutter of this type, the aperture 109 has an area of W*(L−R), where L=φR. The total area occupied by each of the switchable devices 100 is W*(L+R). As noted below, some arrays may have substantially more switchable devices 100 than are shown in FIG. 1B.

In some implementations, the materials used to form the shutter arms 107 have an engineered stress gradient greater than zero. In some implementations, the stress gradient can be up to approximately 1000 MPa/um. In some implementations, the shutter arms 107 may be formed of a single material, whereas in other implementations the shutter arms 107 may be formed of two or more layers of different materials. Examples of some such materials are described below. One or more of the layers of the shutter arms 107 can be dielectrics, but a conductive layer will permit electrostatic actuation of the shutter arms 107. The shutter arm material may be formed as a bimorph or a multimorph with an engineered stress in each layer, resulting in the desired stress gradient in the shutter arms 107. This stress gradient may cause a desired radius of curvature, causing the shutter arms 107 to furl and move away from the apertures 109 when unbiased.

In some implementations wherein the shutter arms 107 are formed of a single material, the radius of curvature of the shutter arms 107 may be governed by the following equation:

$$R = t \frac{E}{\Delta \sigma} \quad \text{(Equation 1)}$$

In Equation 1, t is the film thickness, E is the biaxial Young's modulus and $\Delta\sigma$ is the stress gradient.

If the shutter arms 107 are formed of two or more layers of different material, the radius of curvature of the shutter arms 107 may be governed by the following equation:

$$R = \sum_{i=1}^{n} [E_i I_{yi} - C_i(z_N - z_i)] \Big/ \sum_{i=1}^{n} [D_i(z_N - z_i)], \quad \text{(Equation 2)}$$

where i indicates the layer in the stack of n layers, $E_i$ is the Young's modulus of the $i^{th}$ layer, $I_{yi}$ is the inertia moment of the $i^{th}$ layer, $C_i$ and $D_i$ are constants defined below, $z_N$ is the z-coordinate of the neutral plane and $z_i$ is the z-coordinate of the $i^{th}$ layer in the stack.

Figure 1E:
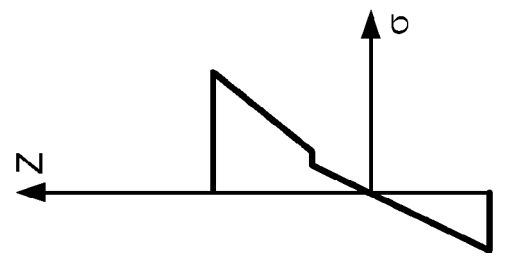
FIG. 1E shows an example of a graph of the stress in the layers of the cross-section depicted in FIG. 1C.
Figure 1D:
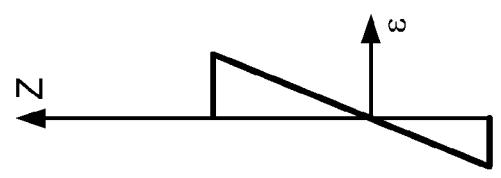
FIG. 1D shows an example of a graph of the strain in the layers of the cross-section depicted in FIG. 1C.
Figure 1C:
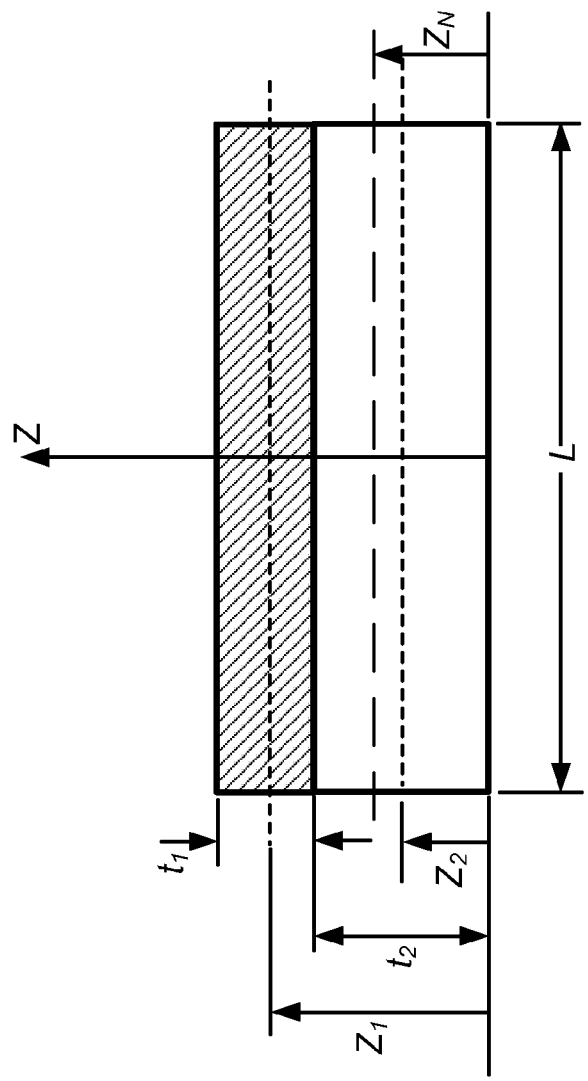
FIG. 1C shows an example of a cross-section through a two-layer stack having a length L.

FIG. 1C shows an example of a cross-section through a two-layer stack having a length L. The thickness of the first layer is shown as $t_1$ and the thickness of the second layer is shown as $t_2$. $Z_1$ is the z-coordinate of the first layer in the stack and $Z_2$ is the z-coordinate of the second layer in the stack. $Z_N$ is the z-coordinate of the neutral plane.

The parameters C and D may be defined as follows:

$$C_i = \frac{E_i A_i}{2} \left\{ t_1 + 2\sum_{k=2}^{i-1} t_k + t_i - \frac{\sum_{i=2}^{n}\left[E_i A_i \left(t_1 + 2\sum_{k=2}^{i-1} t_k + t_i\right)\right]}{E_1 A_1 + \sum_{i=2}^{n}(E_i A_i)} \right\} \quad \text{(Equation 3)}$$

$$D_i = E_i A_i \left\{ \varepsilon_1 - \varepsilon_i - \frac{\sum_{i=2}^{n}[(\varepsilon_1 - \varepsilon_i)E_i A_i]}{E_1 A_1 + \sum_{i=2}^{n}(E_i A_i)} \right\} \quad \text{(Equation 4)}$$

$A_i$ is the $i^{th}$ layer cross sectional area and $\varepsilon_i$ is the strain in the $i^{th}$ layer. FIG. 1D shows an example of a graph of the strain in the layers of the cross-section depicted in FIG. 1C. The inflection point of the strain c shown in FIG. 1D corresponds with the z-coordinate of the neutral plane $Z_N$ shown in FIG. 1C. FIG. 1E shows an example of a graph of the stress in the layers of the cross-section depicted in FIG. 1C. In this example, there is a stress discontinuity at the boundary between layer 1 and layer 2.

Figure 2A:
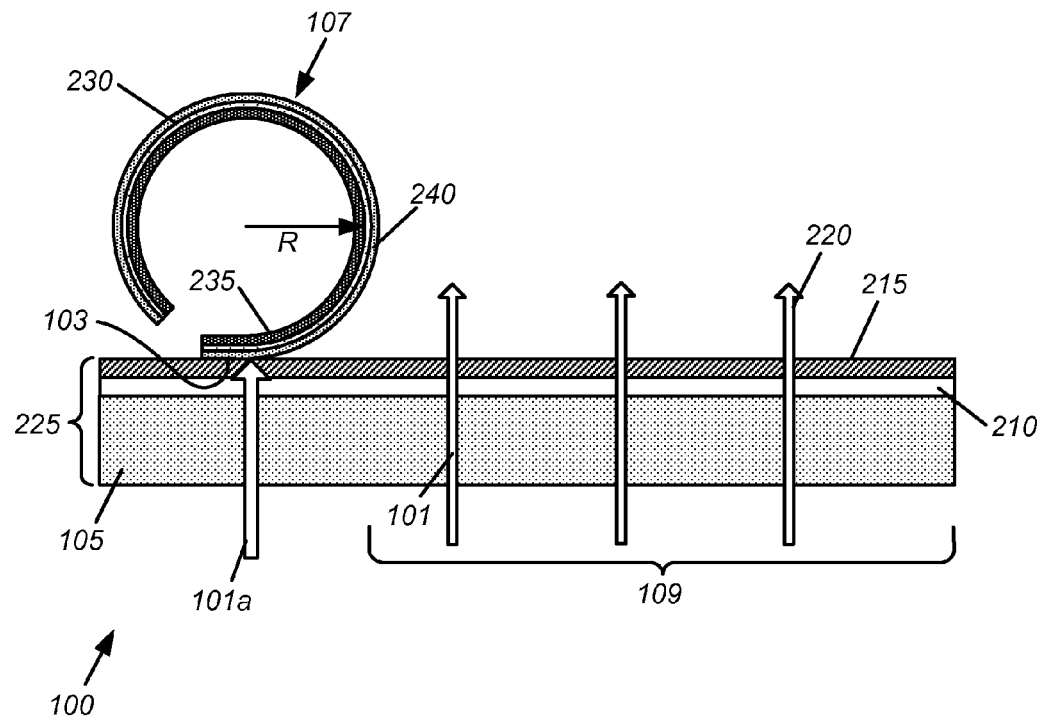
FIG. 2A shows an example of a shutter-based switchable device with a shutter arm in an open state.

FIG. 2A shows an example of a shutter-based switchable device with a shutter arm in an open state. In this state, most of the incident light 101 incident on the substantially transparent substrate 105 passes through the substantially transparent electrode layer 210 (an indium tin oxide (ITO) layer in this example but other Transparent Conductive Oxides (TCO's) also may be used, e.g., tin oxide (SnO), aluminum zinc oxide (AZO), fluorinated zinc oxide (ZnOF), etc.) and through the substantially transparent dielectric layer 215 to emerge as the transmitted light 220. The substantially transparent substrate 105, the substantially transparent electrode layer 210 and the substantially transparent dielectric layer 215 collectively form one example of a substrate stack 225. The shutter arm 107 is attached to the substrate stack 225 at the anchor area 103. Except for the incident light 101a that emerges under the shutter arm 107 (which is furled in this example), most of the incident light 101 will pass through the switchable device 100 in this implementation.

In some implementations, the shutter arm 107 has a radius in the range of 200 μm to 300 μm when furled. In this example, the shutter arm 107 has a radius of approximately 270 μm when furled and an arm length of approximately 1700 μm. Accordingly, the total area occupied by each of the switchable devices 100 is W*(1700 μm+270 μm), or slightly less than W*2 mm. Assuming that W is slightly less than 2 mm, each of the switchable devices 100 would occupy slightly less than 4 mm². Even accounting for the intervening spaces between adjacent instances of the switchable devices 100, a one square meter array of the switchable devices 100 would include approximately 250,000 of the switchable devices 100. In alternative implementations, the length, width and/or radius of the shutter arms 107 may be larger or smaller than those of the previous examples.

In this implementation, the shutter arm 107 includes an absorber layer 230, which is a molybdenum-chromium (MoCr) layer in this example. The absorber layer 230 is disposed between the layer 235 and the layer 240. Here, the layers 235 and 240 are substantially transparent across the visible spectrum. In this example, the layer 235 is formed of approximately 0.35 μm of SiON having a mean stress of −95 MPa. The layer 240 is formed of approximately 0.15 μm of $SiO_2$ having a mean stress of approximately 30 MPa. Accordingly, there is a differential stress gradient between the layer 235 and the layer 240 that makes the shutter arm 107 bend out of plane and "roll up." By applying a voltage between the MoCr layer, absorber layer 230, which functions as an electrode, and the substantially transparent electrode layer 210, the shutter arm can be closed, rolled flat, parallel to the substrate.

In this example, the absorber layer 230 is approximately 16 nm thick and does not substantially affect the mechanical behavior of the shutter arm 107. Alternative implementations may include different numbers of layers, layers of different thicknesses and/or layers formed of other materials. For example, the absorber layer 230 may be formed of titanium, molybdenum, chromium, or tantalum. Layer 240 can be formed of other dielectrics with different dielectric materials. For example SiON, TiO2, or SiN can be used.

Figure 2B:
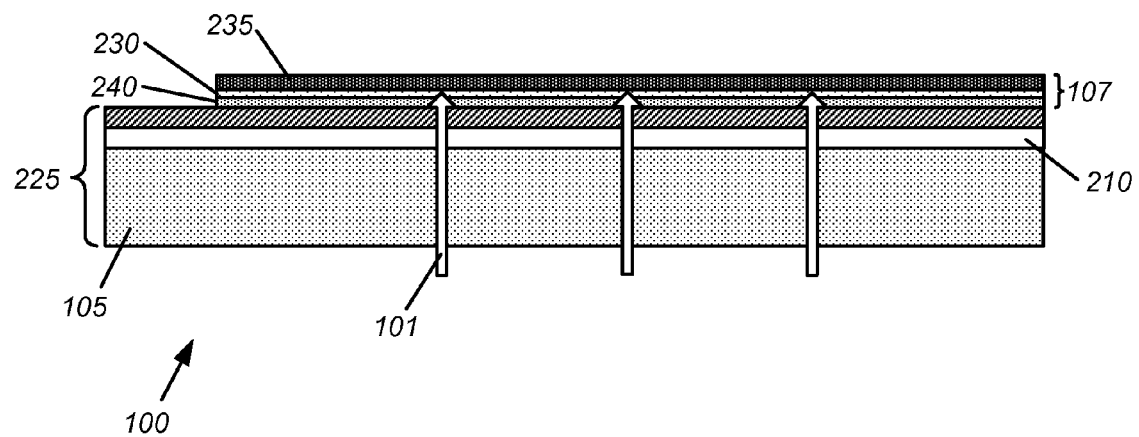
FIG. 2B shows an example of the shutter-based switchable device of FIG. 2A with the shutter arm in a closed state.

FIG. 2B shows an example of the shutter-based switchable device of FIG. 2A with the shutter arm in a closed state. When a control system applies a sufficient voltage to the substantially transparent electrode layer 210, the shutter arm 107 unfurls and closes the aperture 109. The thickness of the absorber layer 230 may be varied to allow varying amounts of light to be transmitted through the closed switchable device. Accordingly, relatively less of the incident light 101 may be transmitted through the switchable device 100 when the shutter arm 107 is closed than when the shutter arm 107 is open. In some implementations, the thickness of the absorber layer 230 may be selected such that little or none of the transmitted light 220 is transmitted through the switchable device 100 in the visible range when the shutter arm 107 is closed.

TABLE 1

| Layer | Material | d [nm] |
|---|---|---|
| #1 | substrate | 70000 |
| #2 | ITO | 50 |
| #3 | SiO$_2$ | 200 |
| #4 | SiO$_2$ | 350 |
| #5 | MoCr | 16 |
| #6 | SION | 150 |
| #7 | air | 0 |

Table 1 provides an example of the layers of the shutter arm 107 and the substrate stack 225 in one implementation. In this example, the layers 1-3 of Table 1 correspond to the substantially transparent substrate 105, the substantially transparent electrode layer 210 and the substantially transparent dielectric layer 215 of the substrate stack 225. The layers 4-6 of Table 1 correspond to the layer 240, the absorber layer 230 and the layer 235, respectively, of the shutter arm 107.

Figure 3:
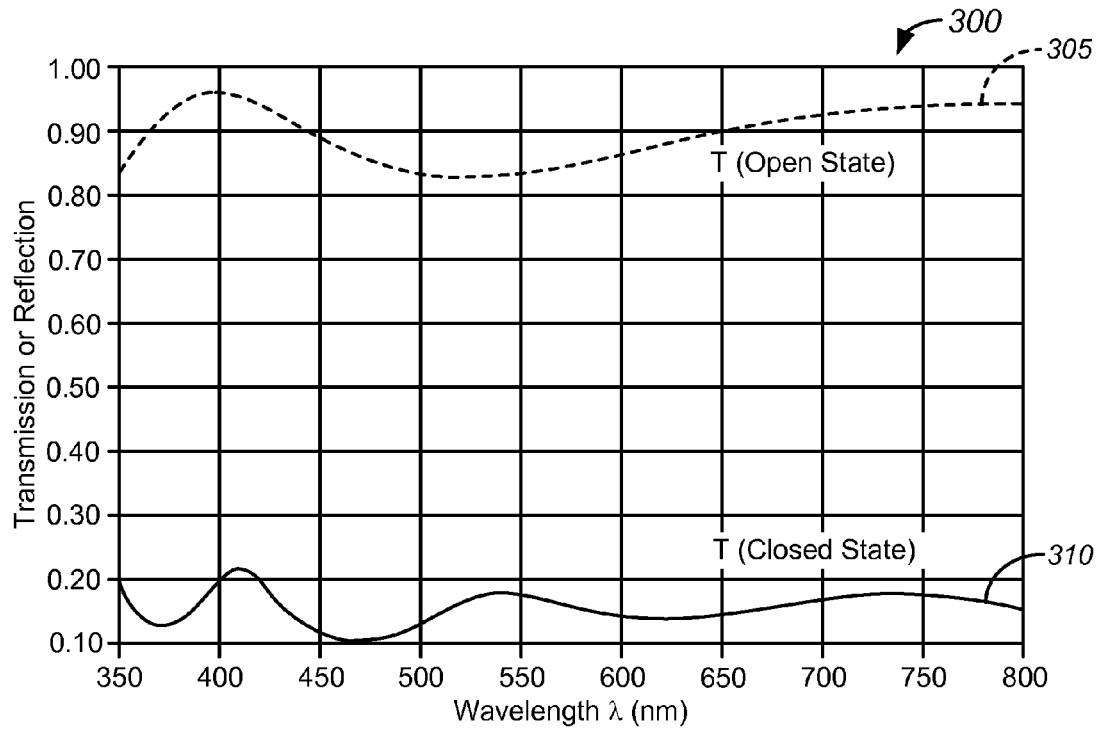
FIG. 3 shows an example of a graph indicating the light transmitted through the shutter-based switchable device of FIGS. 2A and 2B with the shutter arm in an open state and with the shutter arm in a closed state.

FIG. 3 shows an example of a graph indicating the light transmitted through the shutter-based switchable device of FIGS. 2A and 2B with the shutter arm in an open state and with the shutter arm in a closed state. The curve 305 indicates the transmissivity of the switchable device 100 with the shutter arm 107 in an open state. In this state, over 80% of the incident light 101 in the visible range is transmitted through the switchable device 100 as substantially white light. The curve 310 indicates the transmissivity of the switchable device 100 with the shutter arm 107 in a closed state. In this state, only about 16% of the incident light 101 in the visible range is transmitted through the switchable device 100. In this example, the transmitted light 220 has a pale green color.

In alternative implementations, the optical properties of the shutter arm 107 may be modified. For example, holes may be made in the shutter arm 107 to allow some light through when the aperture is closed. Alternatively, or additionally, the top side of the shutter arm (opposite the side facing the substantially transparent electrode layer 210), may be coated with color filter material or reflective material to give a desired appearance for the switchable device 100 with the shutter arm 107 in a closed state.

Alternative implementations of the switchable device 100 may include a set of layers or "stack" that form an interference filter. As such, the interference filter is also referred to as an interference filter stack below. The interference filter may be configured to pass or block one or more predetermined wavelength ranges. An example of one such stack is provided in Table 2, below:

TABLE 2

| Layer | Material | d (nm) |
|---|---|---|
| #1 | Substrate | 700 |
| #2 | ITO | 50 |
| #3 | SiO2 | 200 |
| #4 | SiO2 | 350 |
| #5 | TiO2 | 55 |
| #6 | SiO2 | 99 |
| #7 | TiO2 | 110 |
| #8 | SiO2 | 99 |
| #9 | TiO2 | 55 |
| #10 | SiON | 150 |
| #11 | MoCr | 5 |

The stack for the interference filter of Table 2 is the layers 5-9 of Table 2, shown in yellow. In this example, the layers 4 through 11 form the shutter arm 107. Because the interference filter stack is included as part of the shutter arm 107 in this implementation, both the optical and mechanical properties of the interference filter stack are evaluated so that the shutter arm 107 not only provides the desired optical effects but also has desirable mechanical characteristics. For example, the mechanical properties of the interference filter stack may be evaluated to determine that the shutter arm 107 has an acceptable radius in the range of about 50-400 um, when in the open state, does not require an unacceptably large actuation voltage, such as an actuation voltage greater than about 130V. For example, the mechanical properties of all layers of the shutter arm 107, including the interference filter stack, may be evaluated with reference to Equations 2-4, above, to evaluate the radius of curvature of shutter arms 107 that includes these layers. In the example shown in Table 2, the interference filter layers are symmetrical and therefore "stress neutral." Although not essential, making the interference filter layers stress neutral simplifies the design of the shutter arm 107.

In alternative implementations, the interference filter stack may include other materials. For example, the interference filter stack may include one or more magnesium fluoride, silicon nitride, and/or tantalum oxide layers. If other materials are used, the thickness of individual layers and/or the overall thickness of the interference filter stack may be different from the examples shown herein. However, such other implementations would generally include a similar sequence of higher refractive index and lower refractive index materials.

In alternative implementations, the substrate stack 225 may include at least some layers of an interference filter stack. In some such implementations, all layers of the interference filter stack may be made part of the substrate stack 225, whereas in other implementations, both the substrate stack 225 and the shutter arm 107 may include some layers of the interference filter stack.

Figure 4A:
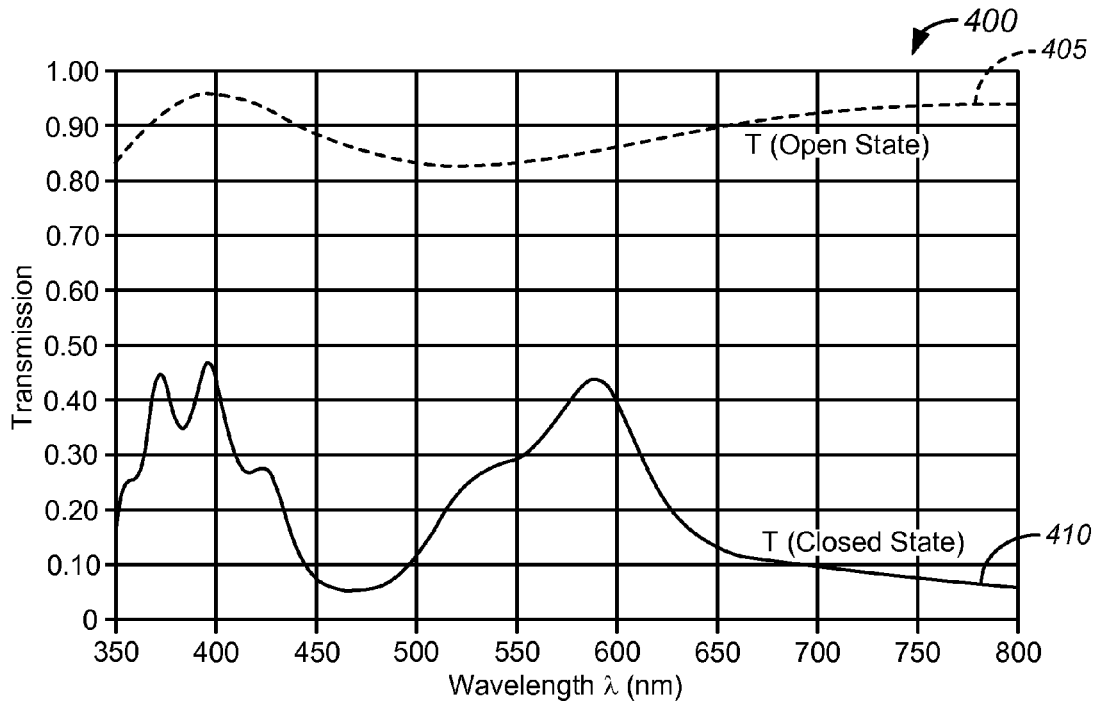
FIG. 4A shows an example of a graph indicating the light transmitted through an alternative shutter-based switchable device with the shutter arm in an open state and with the shutter arm in a closed state.

FIG. 4A shows an example of a graph indicating the light transmitted through an alternative shutter-based switchable device with the shutter arm in an open state and with the shutter arm in a closed state. In this example, the shutter arm 107 includes the layers 4 through 11 of Table 2. Accordingly, the shutter arm 107 includes the interference filter stack of layers 5 through 9.

The curve 405 indicates the transmissivity of the switchable device 100 with the shutter arm 107 in an open state. In this state, over 80% of the incident light 101 in the visible range is transmitted through the switchable device 100 as substantially white light. The curve 410 indicates the transmissivity of the switchable device 100 with the shutter arm 107 in a closed state. In this state, the interference filter of the shutter arm 107 causes over 30% of the incident light 101 that is in the wavelength range from approximately 560 nm to 620 nm to be transmitted through the switchable device 100, while suppressing the transmission of light in adjacent wavelength ranges. Accordingly, the interference filter causes the transmitted light 220 to have a yellow-gold color.

However, the thicknesses, materials, etc., of the interference filters referenced in Table 2 and FIG. 4A are only examples. In alternative implementations, the interference filter may be configured to transmit or block incident light 101 of other wavelength ranges. In some such implementations, the interference filter may be configured to filter out infrared light. If such an interference filter is disposed in the shutter arm 107, the switchable device 100 can pass infrared light when the shutter arms 107 are in an open state and can filter out infrared light when the shutter arms 107 are in a closed state. An example of such an ontical stack is shown in the following table.

TABLE 3

| Layer | Material | d [nm] |
|---|---|---|
| #1 | Substrate | 70000 |
| #2 | ITO | 50 |
| #3 | SiO2 | 200 |
| #4 | SiO2 | 350 |
| #5 | Ag | 11 |
| #6 | SiN | 60 |
| #7 | Ag | 11 |
| #8 | SiN | 150 |
| #9 | ITO | 50 |

In the example depicted in Table 3, the layers of the shutter include the layers #4-#9. When the shutter is open, light in the visible (400 nm-780 nm) wavelengths is transmitted. When the shutter is closed, light in the visible range is still transmitted, but light in the infrared range (700 nm-2500 nm) is substantially reduced. The transmission and reflection spectra for this shutter in the open and closed position are shown in FIGS. 4B and 4C.

Figure 4B:
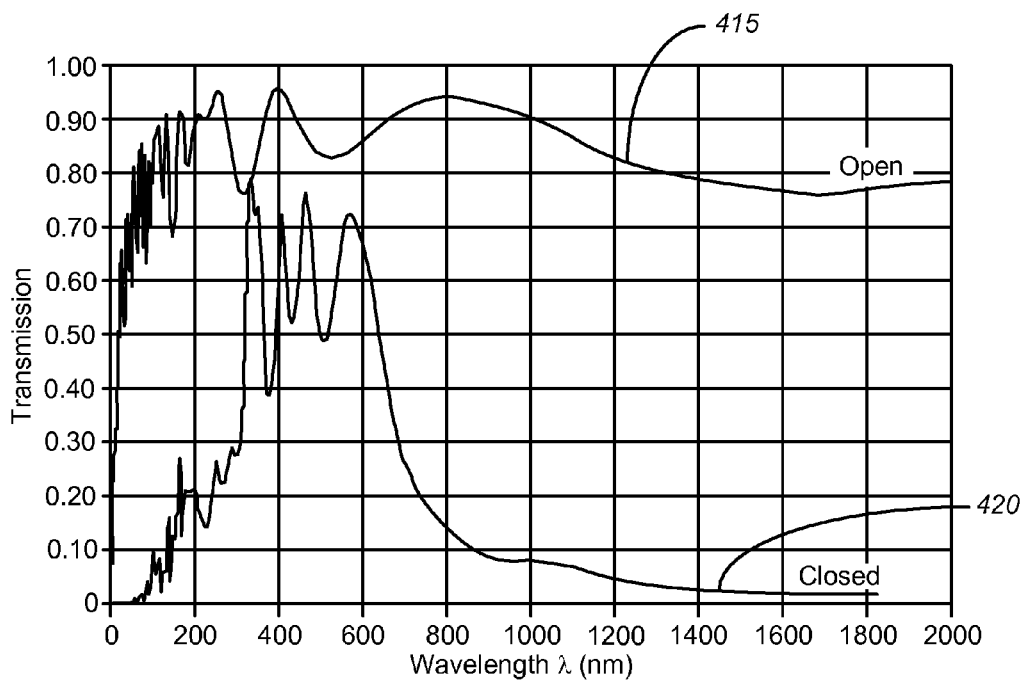
FIG. 4B shows an example of a graph indicating the light transmitted through another alternative shutter-based switchable device with the shutter arm of Table 3 in an open state and in a closed state.

FIG. 4B shows an example of a graph indicating the light transmitted through another alternative shutter-based switchable device with the shutter arm of Table 3 in an open state and with the shutter arm in a closed state. The curve 415 indicates light transmitted through the switchable device when the shutter of Table 3 is open, whereas the curve 420 indicates light transmitted through the switchable device when the shutter is closed. By comparing the curve 415 with the curve 420, it may be observed that the switchable device transmits a substantial amount of light in the visible range even when the shutter is closed. However, the transmission of light in the infrared range is substantially reduced when the shutter is closed.

Figure 4C:
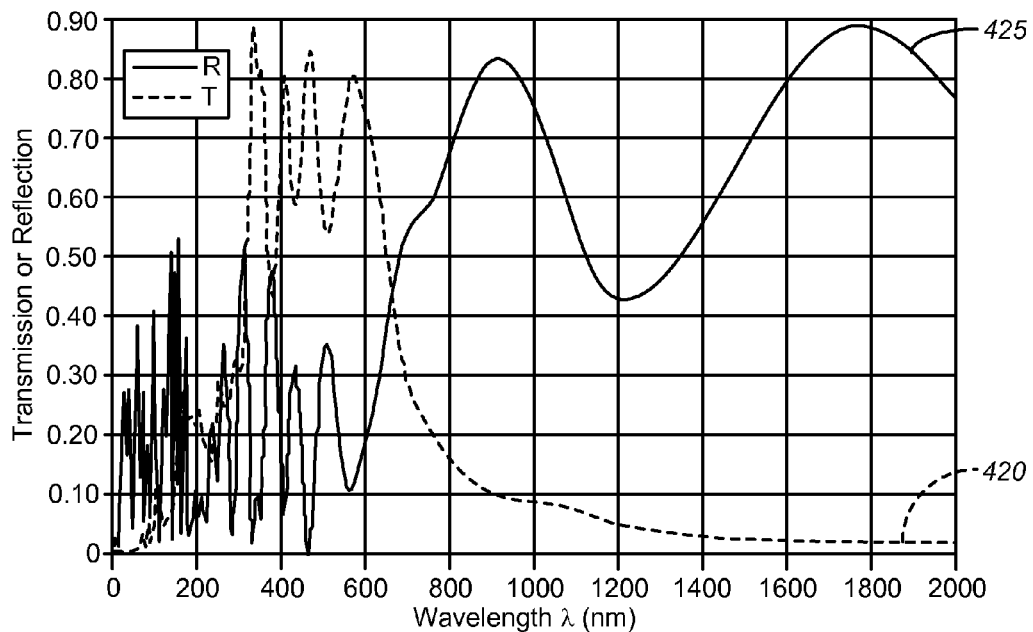
FIG. 4C shows an example of a graph indicating the light transmitted through and reflected from the shutter-based switchable device of FIG. 4B with the shutter arm in a closed state.

FIG. 4C shows an example of a graph indicating the light transmitted through and reflected from the shutter-based switchable device of FIG. 4B with the shutter arm in a closed state. The curve 425 indicates light reflected from the switchable device when the shutter of Table 3 is closed, whereas the curve 420 indicates light transmitted through the switchable device when the shutter is closed. By comparing the curve 425 with the curve 420, it may be observed that the reflectivity of the shutter is substantially higher in the infrared range, causing the amount of transmitted light in the infrared range to decrease substantially.

Figure 5A:
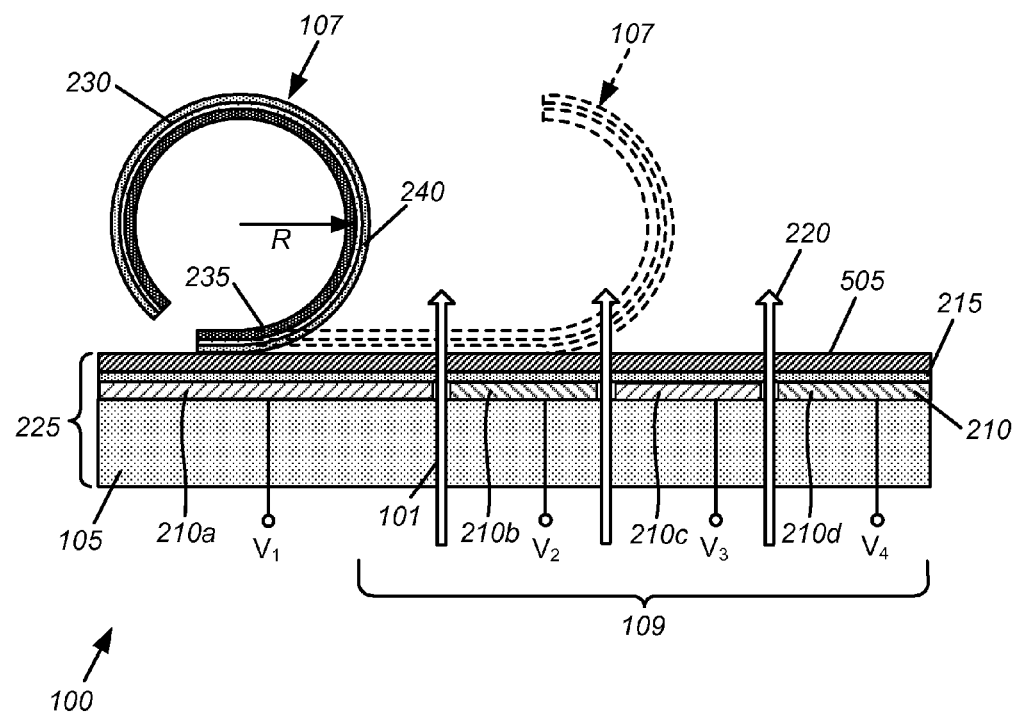
FIG. 5A shows an example of a shutter-based switchable device having a substrate stack that includes an interference filter, with the shutter arm in an open state and in a partially closed state.
Figure 5B:
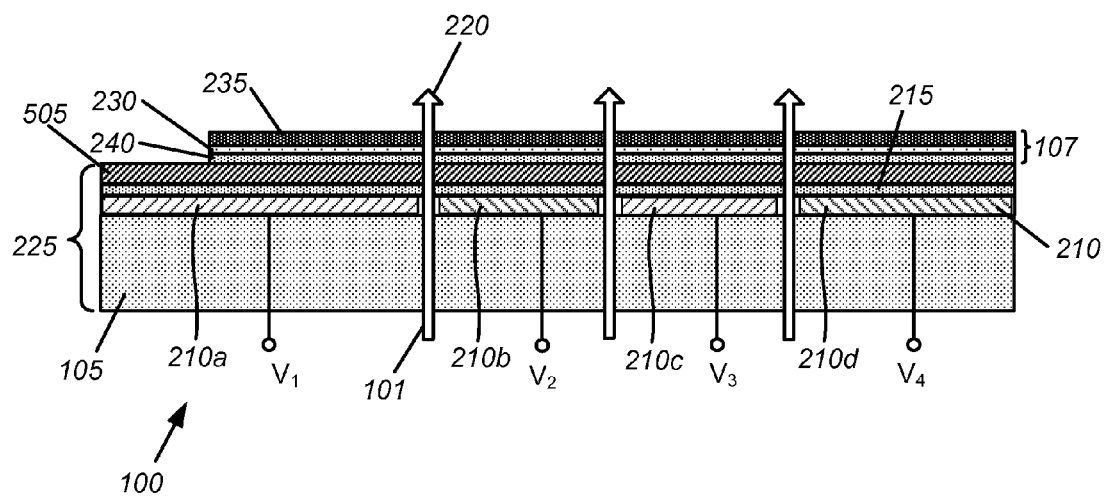
FIG. 5B shows an example of the shutter-based switchable device of FIG. 5A with the shutter arm in a closed state.

Some switchable devices include an interference filter formed on the substrate, so that colored light is transmitted when the shutter arm 107 is open. One example is shown in FIGS. 5A and 5B. FIG. 5A shows an example of a shutter-based switchable device having a substrate stack that includes an interference filter, with the shutter arm in an open state and in a partially closed state. FIG. 5B shows an example of the shutter-based switchable device of FIG. 5A with the shutter arm in a closed state.

In the example shown in FIG. 5A, the substantially transparent electrode layer 210 has been patterned into the sections 210a, 210b, 210c and 210d. In this implementation, the substrate electrodes of the switchable device 100 are configured to apply voltage to each of the sections 210a, 210b, 210c and 210d separately. In FIG. 5A, the shutter arm 107 is shown in two positions. The first position of the shutter arm 107 is an open state, depicted in solid lines, in which an actuation voltage is not being applied to any of the sections 210a, 210b, 210c and 210d. The second position of the shutter arm 107 is a partially closed state, wherein an actuation voltage $V_1$ has been applied to the section 210a and an actuation voltage $V_2$ has been applied to the section 210b. If an actuation voltage $V_3$ is also applied to the section 210c, the shutter arm will be more fully closed. If an actuation voltage $V_4$ is also applied to the section 210d, the shutter arm will close completely, as shown in FIG. 5B.

In this example, the interference filter 505 has been disposed on the substantially transparent dielectric layer 215 of the substrate stack 225. Although the interference filter 505 is depicted as a solid and uniform layer in FIGS. 5A and 5B for ease of viewing, the interference filter 505 includes the layers 4 through 8 of Table 4, below.

TABLE 4

| Layer | Material | d (nm) | | |
|---|---|---|---|---|
| #1 | Substrate | 70000 | } | |
| #2 | ITO | 50 | } | Bottom electrode |
| #3 | SiO2 | 200 | } | and insulator |
| #4 | TiO2 | 55 | } | |
| #5 | SiO2 | 99 | } | |
| #6 | TiO2 | 110 | } | Interference filter |
| #7 | SiO2 | 99 | } | |
| #8 | TiO2 | 55 | } | |
| #9 | SiO2 | 350 | } | |
| #10 | MoCr | 5 | } | Shutter arm layers |
| #11 | SiON | 150 | } | & electrode |

Layers 1 through 8 of Table 4 correspond with the substrate stack 225 shown in FIGS. 5A and 5B. Layer 1 corresponds with the substantially transparent substrate 105, layer 2 corresponds with the substantially transparent electrode layer 210 and layer 3 corresponds with the substantially transparent dielectric layer 215. Layers 4 through 8 form the same interference filter stack 505 that is shown in Table 2.

Layers 9 through 11 of Table 4 correspond with the shutter arm 107 shown in FIGS. 5A and 5B: layer 9 corresponds to the layer 240, layer 10 corresponds to the absorber layer 230 and layer 11 corresponds to the layer 235 of the shutter arm 107. Accordingly, layers 9-11 of Table 4 correspond to layers 4-6 of Table 1.

Figure 6:
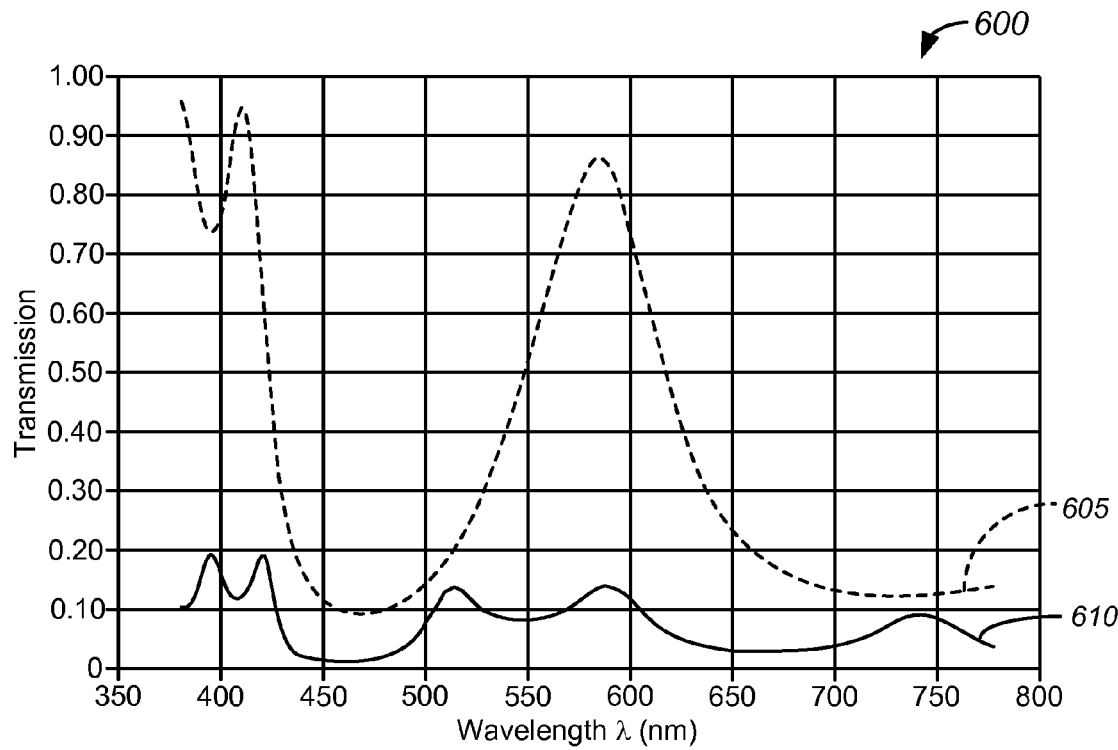
FIG. 6 shows an example of a graph indicating the light transmitted through the shutter-based switchable device of FIGS. 5A and 5B with the shutter arm in an open state and with the shutter arm in a closed state.

FIG. 6 shows an example of a graph indicating the light transmitted through the shutter-based switchable device of FIGS. 5A and 5B with the shutter arm in an open state and with the shutter arm in a closed state. When the shutter arm 107 is open, the interference filter 505 causes a transmissivity peak at approximately 585 nm, wherein over 85% of the incident light 101 is transmitted through the substrate stack 225 (see curve 605). Accordingly, the interference filter 505 causes the transmitted light 220 to have a yellow-gold color. When the shutter arm 107 is closed, the window is relatively darker because of the effect of the absorber layer 230 in the shutter arm 107 (see curve 610). In this example, the transmitted light 220 has a dim yellow-gold color.

Figure 7:
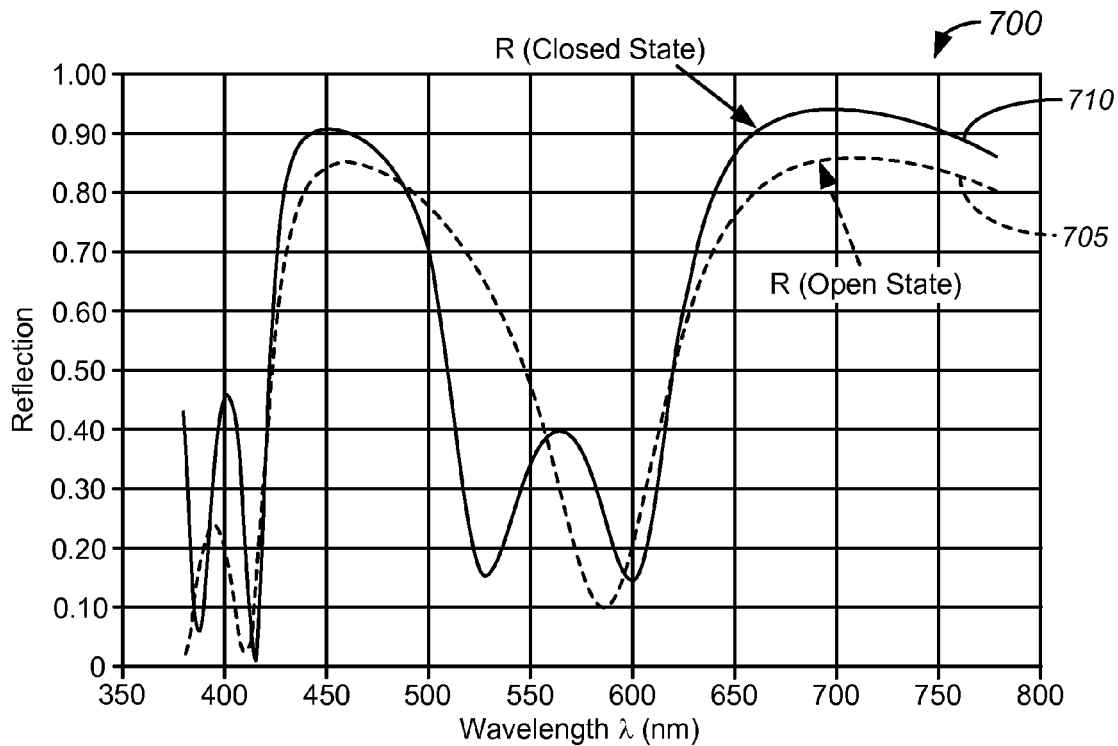
FIG. 7 shows an example of a graph indicating the light reflected by the shutter-based switchable device of FIGS. 5A and 5B with the shutter arm in an open state and with the shutter arm in a closed state.

FIG. 7 shows an example of a graph indicating the light reflected by the shutter-based switchable device of FIGS. 5A and 5B with the shutter arm in an open state and with the shutter arm in a closed state. When the shutter arm 107 is open, the interference filter 505 causes a blue-green color to be reflected from the switchable device 100. When the shutter arm 107 is closed, the interference filter 505 causes a bluish-white color to be reflected from the switchable device 100 when the device is in the closed state.

Figure 8:
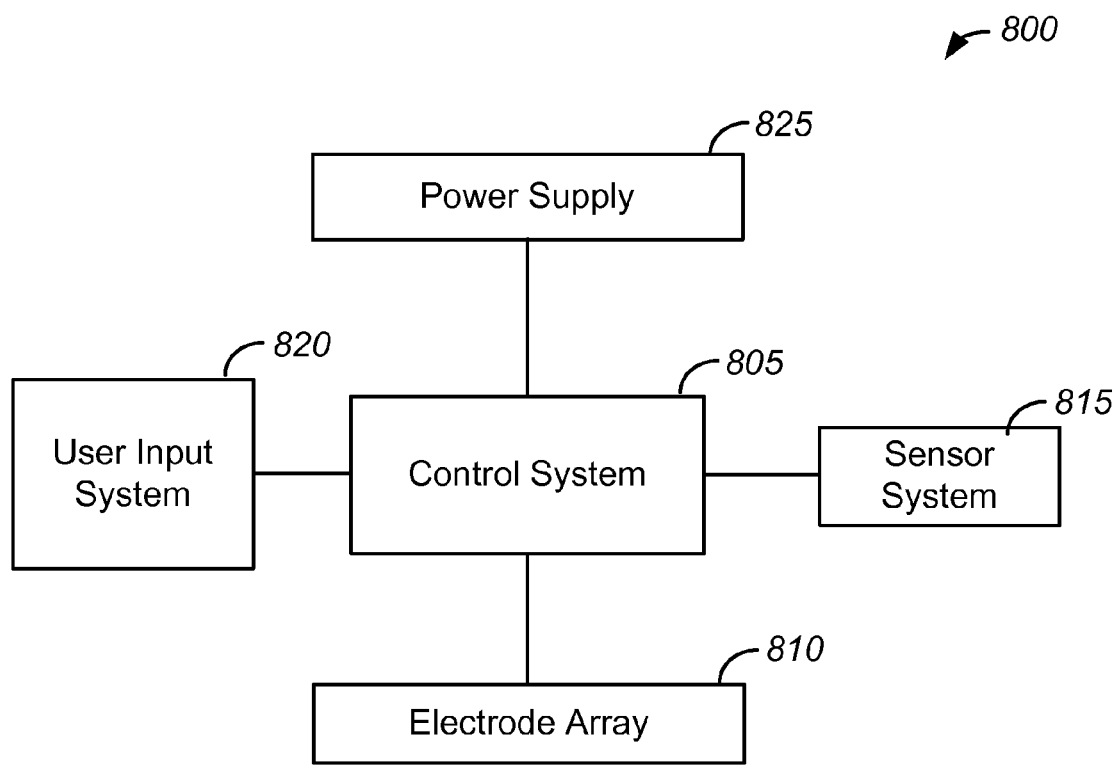
FIG. 8 shows an example of a block diagram indicating components of a switchable window system.

FIG. 8 shows an example of a block diagram indicating components of a shutter-based switchable window system. In this example, the switchable window system 800 includes a control system 805 for controlling the electrode array 810. The control system 805 may include a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

The electrode array 810 may include an electrode layer of a substrate stack, such as the substantially transparent electrode layer 210 of the substrate stack 225 described above with reference to FIGS. 2A, 2B, 5A and 5B. The electrode array 810 may also include routing electrodes for conveying electrical signals from the control system 805 to electrodes of the substantially transparent electrode layer 210. For example, the control system 805 may convey electrical signals to electrodes of the substantially transparent electrode layer 210 to produce a sufficient voltage to close the shutter arm 107 and cover the aperture 109. When the control system 805 is not applying sufficient voltage, the shutter arm 107 may roll up and uncover the aperture 109. In some implementations, the control system 805 may be configured to apply intermediate voltage levels for positioning the shutter arm 107 in a range of positions between fully open and fully closed. In some implementations, the electrode array 810 may be configured to allow the control system 805 to address separate groups of electrodes in the electrode array 810.

In this example, the switchable window system 800 includes a sensor system 815 having one or more sensors. The sensor system 815 may be configured for supplying sensor data to the control system 805. The sensor data may, for example, include ambient light sensor data and/or temperature sensor data. The control system 805 may be configured to control the electrode array 810 based, at least on part, on the sensor data provided by the sensor system 815.

For example, in some implementations the shutter arm 107 may include an interference filter 505 that is configured to block infrared light. The sensor system 815 may include one or more thermal sensors that are configured to provide temperature data and/or one or more ambient light sensors. The control system 805 may be configured to control the electrode array according to temperature data received from the sensor system 815, e.g., by closing some or all of the shutter arms 107 when the temperature data indicate the temperature has reached a threshold value.

The user input system 820 may include a touch screen, touch pad, a microphone, a key pad and/or any other suitable type of user interface. The user input system 820 may be configured to provide user input data to the control system 805. For example, the user input data may include a threshold temperature value as described above. The user input data may also indicate time data, e.g., time data indicating when the switchable device should be in an open state or a closed state.

The power supply 825 may be any convenient type of power supply. For example, the power supply 825 may include an AC power supply or a DC power supply, e.g., of a battery system.

Figure 9:
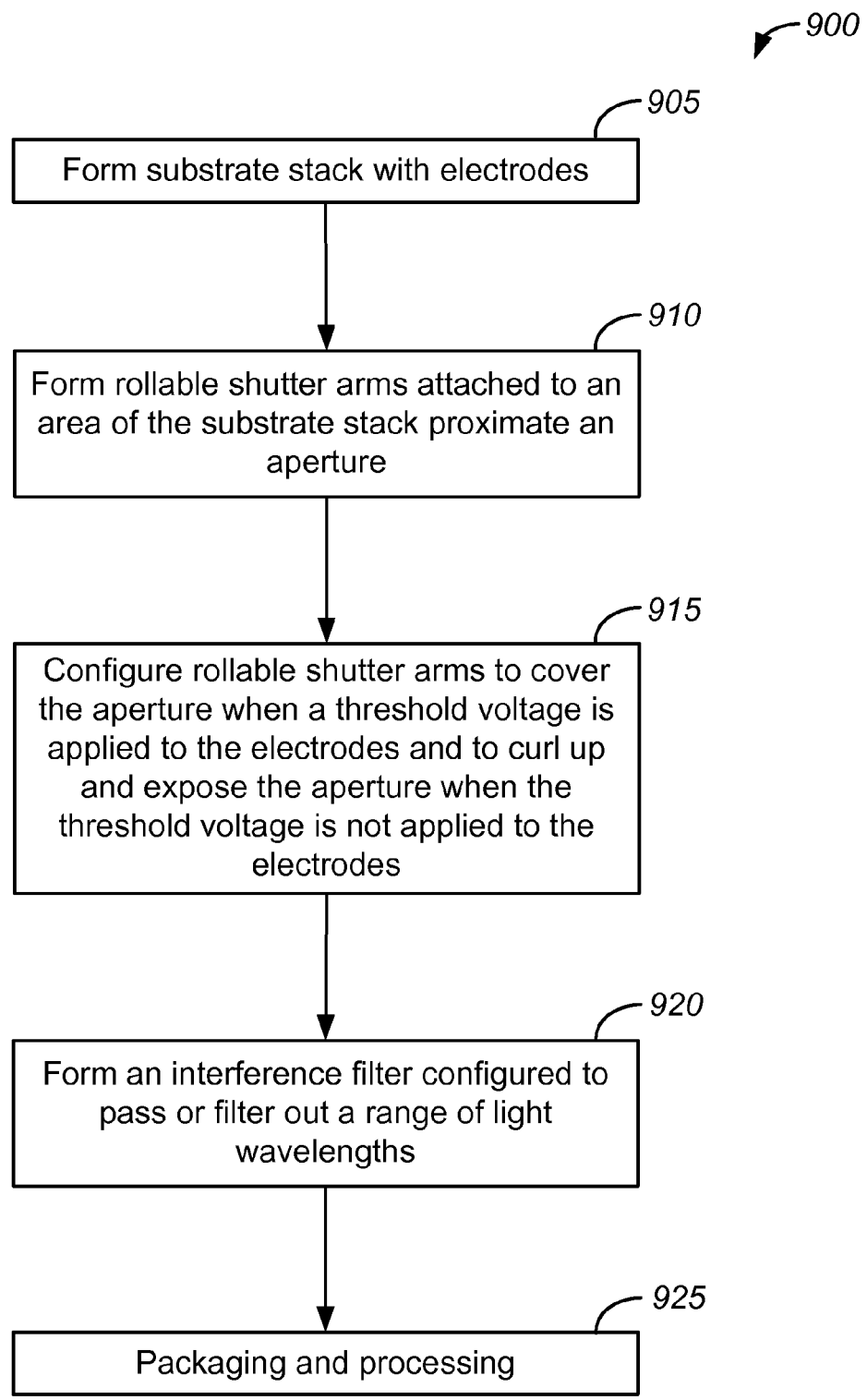
FIG. 9 shows an example of a flow diagram that outlines a process of fabricating shutter-based switchable devices.

FIG. 9 shows an example of a flow diagram that outlines a process of fabricating shutter-based switchable devices. The process 900 begins with block 905, wherein a substrate stack with electrodes is formed. The substrate stack may be similar to one of the substrate stacks 225 described above. The substrate stack may be formed on a glass substrate, on a polymer substrate or on another suitable type of substantially transparent substrate. In some implementations, the substrate stack may be formed on a large-area glass substrate, such as a Gen 5 (1100 mm by 1300 mm) glass substrate or a Gen 6 (1500 mm by 1850 mm) glass substrates. The electrodes may be formed of substantially transparent material, such as ITO.

Block 910 involves a process of forming a plurality of rollable shutter arms, such as the shutter arms 107 described above. The rollable shutter arms are attached to an area of the substrate stack proximate an aperture, such as the aperture 109 described above. Accordingly, some such rollable shutter arms may be formed of layers such as those described above with reference to Tables 1-3.

Block 915 involves configuring the rollable shutter arms to cover an aperture when a actuation voltage is applied to the electrodes in the substrate stack. This process may involve including a conductive layer to allow actuation of the shutter arms. Block 915 also involves configuring the rollable shutter arms to curl up and expose the aperture when the actuation voltage is not applied to the electrodes of the substrate stack. This process may involve creating a desired stress gradient between the layers of the rollable shutter arm, e.g., as described above. Block 915 may involve depositing sacrificial material under all portions of the shutter arms except the anchor area 103 (see FIG. 2A), then releasing the sacrificial material.

Block 920 involves forming an interference filter configured to pass or filter out a range of light wavelengths. The light wavelengths may or may not be in the visible range. Accordingly, the interference filter may be configured to filter out light in the infrared range, the visible range or the ultraviolet range. In some implementations, block 920 may involve forming at least part of the interference filter in the substrate stack. Other implementations may involve forming the entire interference filter in the rollable shutter arms. Alternatively, the interference filter can be put on the substrate before forming the rollable shutter arm. In another implementation, part of the interference filter can be put on the substrate, and then the remaining part of the interference filter can be formed on the rollable shutter arm.

Block 925 may involve further processing and packaging. For example, block 925 may involve configuring a control system to control the rollable shutter arms. Block 925 may involve configuring a sensor system, a user input system and/or a power supply to the control system. Block 925 may involve separating substrate panels into multiple switchable devices 100 or joining substrate panels to form a larger switchable device 100. Block 925 may involve packaging the switchable devices and/or components thereof for shipment or storage.

OTHER EXAMPLES

Alternative implementations may include different substrates and/or substrate stacks. For example, the switchable devices 100 may include a flexible substrate. The substrate may be coated with color filter material to generate a desired color when the shutter arm 107 is open. A reflective or transmissive interferometric modulator stack may be used to create a switchable mirror with desired color characteristics, e.g., a colored mirror when the shutter arm 107 is open.

Some alternative implementations may include different shutter arm structures. In the above examples, the shutter arms 107 have been made optically opaque, configured for low optical transmission or designed to transmit a particular color. Other implementations include transparent regions formed in the shutter arm 107. In some implementations, the transparent regions of the shutter arm 107 may include a light diffusing material so that the window can be switched from transparent to diffuse. Alternatively, color filter material may be included in translucent regions of the shutter arm 107, so the window can be switched from transparent to translucent with a given color or colors.

Other alternative implementations may include different electrode configurations. While the examples above show a substantially transparent electrode covering the light aperture, electrodes may be provided on the substrate surface along the edges of the aperture. Some such electrodes may be tapered. Such electrode configurations may allow increased control over the shutter arm 107, permitting it to be partially rolled down and cover part of the light aperture. In some implementations, such as the implementation described above with reference to FIG. 5A, patterned electrodes can be used to allow incremental closure of the light aperture.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blue-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

The word "exemplary" is used exclusively herein to mean "serving as an example, instance, or illustration." Any implementation described herein as "exemplary" is not necessarily to be construed as preferred or advantageous over other possibilities or implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of an IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A switchable device, comprising:
    a substrate stack including a substantially transparent substrate, an aperture and substrate electrodes;
    control circuitry configured for applying voltage to the substantially transparent electrodes;
    a rollable shutter arm configured to at least partially cover the aperture when the control circuitry is applying voltage to the substantially transparent electrodes and to curl up to expose the aperture when the control circuitry is not applying the voltage to the substrate electrodes; and
    an interference filter configured to pass or filter out a range of light wavelengths.

2. The switchable device of claim 1, wherein the rollable shutter arm is configured to partially cover the aperture when a lower voltage is applied to the substrate electrodes and configured to cover the aperture more completely when a higher voltage is applied to the substrate electrodes.

3. The switchable device of claim 1, wherein the substrate electrodes are patterned into sections and wherein voltage may be applied separately to each of the sections.

4. The switchable device of claim 3, wherein the rollable shutter arm is configured to be moved between a range of positions, each position corresponding to a number of sections to which voltage has been applied.

5. The switchable device of claim 1, wherein the substantially transparent substrate is formed, at least in part, of glass.

6. The switchable device of claim 1, wherein the substantially transparent substrate is formed, at least in part, of a polymer.

7. The switchable device of claim 1, wherein the substrate electrodes are formed, at least in part, of a substantially transparent material.

8. The switchable device of claim 1, wherein the substrate electrodes are formed, at least in part, of a conductive metal.

9. The switchable device of claim 1, wherein the switchable device is configured to be disposed on a building window.

10. The switchable device of claim 1, wherein the interference filter is disposed on the shutter arm.

11. The switchable device of claim 1, wherein the interference filter is disposed on the substrate stack.

12. The switchable device of claim 1, wherein the shutter arm includes an absorber layer and wherein relatively less light is transmitted through the aperture when the shutter arm covers the aperture.

13. The switchable device of claim 1, wherein the interference filter is configured to filter out infrared wavelengths.

14. The switchable device of claim 1, wherein the shutter arm is substantially opaque.

15. The switchable device of claim 1, wherein the shutter arm includes transparent regions.

16. The switchable device of claim 1, wherein the shutter arm includes translucent regions and wherein the translucent regions include color filter material.

17. The switchable device of claim 1, wherein the substrate electrodes are disposed in the aperture.

18. The switchable device of claim 1, wherein the substrate electrodes are disposed along edges of the aperture.

19. The switchable device of claim 1, wherein the substrate electrodes are tapered.

20. The switchable device of claim 1, wherein a first part of the interference filter is disposed on the substrate stack and a second part of the interference filter is disposed on the shutter arm.

21. A switchable device, comprising:
    substrate means including a substantially transparent substrate, an aperture and substrate electrodes;
    control means for applying voltage to the substantially transparent electrodes;
    shutter arm means for at least partially covering the aperture when the control means is applying voltage to the substrate electrodes and for uncovering the aperture when the control means is not applying the voltage to the substrate electrodes; and
    interference filter means for passing or filtering out a range of light wavelengths.

22. The switchable device of claim 21, wherein at least part of the interference filter means is disposed on the shutter arm means.

23. The switchable device of claim 21, wherein at least part of the interference filter means is disposed on the substrate means.

24. The switchable device of claim 21, wherein the shutter arm means includes an absorber layer and wherein relatively less light is transmitted through the aperture when the shutter arm means covers the aperture.

25. The switchable device of claim 21, wherein the interference filter means is configured to filter out infrared wavelengths.

26. A method, comprising:
    forming a substrate stack by depositing substrate electrodes on a substantially transparent substrate and forming an aperture area;
    forming a rollable shutter arm attached to an area of the substrate stack proximate the aperture;
    configuring the rollable shutter arm to cover the aperture when voltage is applied to the substrate electrodes and to curl up to at least partially expose the aperture when the voltage is not applied to the substrate electrodes; and
    forming an interference filter configured to pass or filter out a range of light wavelengths.

27. The method of claim 26, further including configuring control circuitry for applying the voltage to the substrate electrodes.

28. The method of claim 26, wherein forming the interference filter involves forming at least a portion of the interference filter on the rollable shutter arm.

29. The method of claim 26, wherein forming the interference filter involves forming at least a portion of the interference filter on the substrate stack.

* * * * *